Aug. 17, 1965   E. R. TAYLOR ETAL   3,200,814
APPARATUS FOR MEASURING REFLEXES, TREMORS AND THE LIKE
Filed March 12, 1963   2 Sheets-Sheet 1
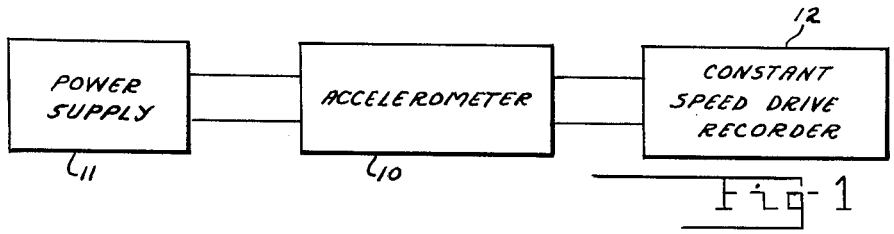
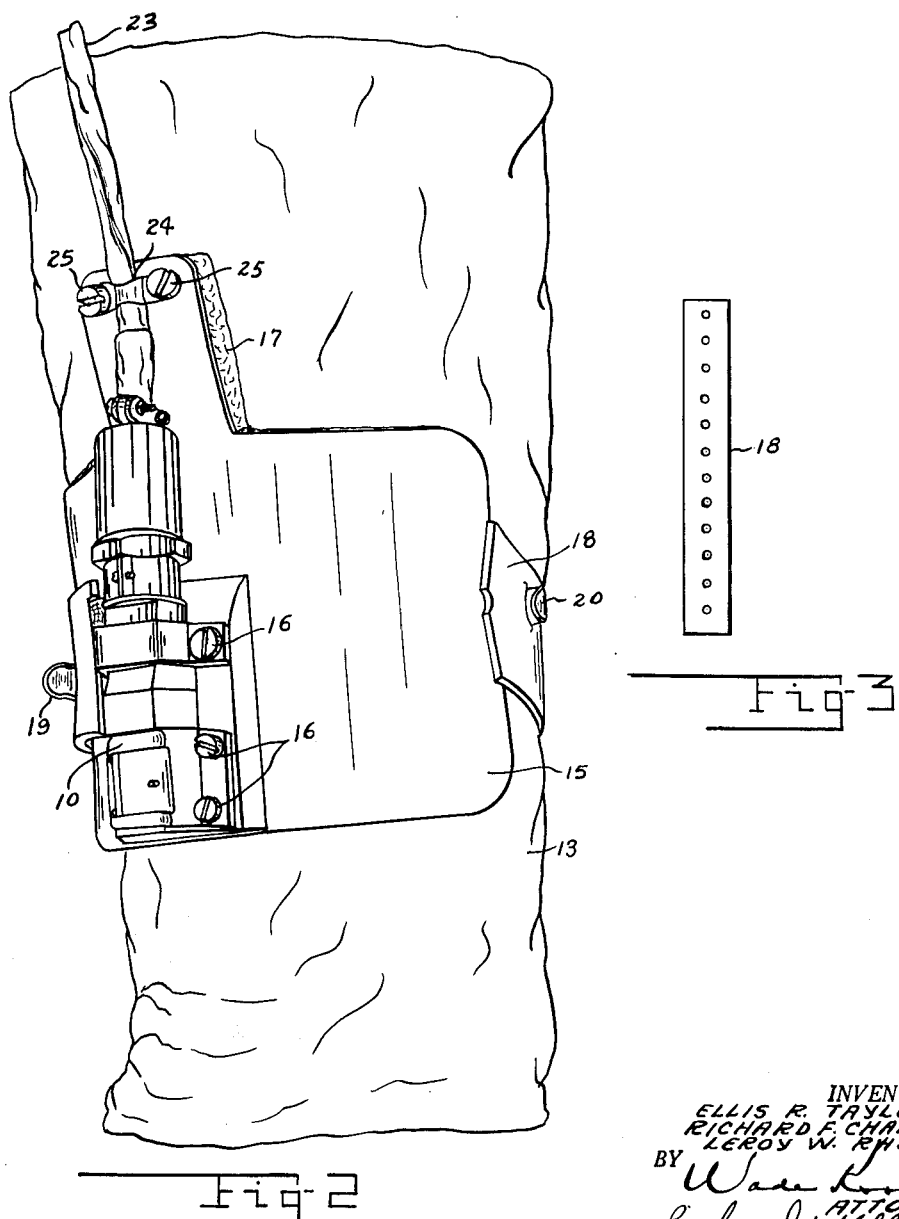
INVENTORS
ELLIS R. TAYLOR
RICHARD F. CHANDLER
LEROY W. RHEIN
BY
ATTORNEY
AGENT Aug. 17, 1965   E. R. TAYLOR ETAL   3,200,814
APPARATUS FOR MEASURING REFLEXES, TREMORS AND THE LIKE
Filed March 12, 1963   2 Sheets-Sheet 2

INVENTORS
ELLIS R. TAYLOR
RICHARD F. CHANDLER
LEROY W. RHEIN
BY
ATTORNEY
AGENT

United States Patent Office 3,200,814
Patented Aug. 17, 1965

3,200,814
APPARATUS FOR MEASURING REFLEXES,
TREMORS AND THE LIKE
Ellis R. Taylor, 1603 Elizabeth St., Lexington, Ky.;
Richard F. Chandler, 616 Madison, Alamogordo,
N. Mex.; and Leroy W. Rhein, 2864B Quay Loop,
Holloman Air Force Base, N. Mex.
Filed Mar. 12, 1963, Ser. No. 264,734
1 Claim. (Cl. 128—2)
(Granted under Title 35, U.S. Code (1952), sec. 266)

The invention described herein may be manufactured and used by or for the United States Government for governmental purposes without payment to us of any royalty thereon.

This invention relates to an apparatus for measuring reflexes, tremors and like muscular responses.

One object of the invention is to provide a device, for measuring muscular responses, which is easy to attach to a limb of a patient under test for taking measurements required.

Another object of the invention is to provide a device, for measuring muscular responses, which lends itself to the rapid measurements required.

A further object of the invention is to provide an apparatus for obtaining accurate, reproducible records of muscular response in a variety of hospital and clinical situations.

These and other objects will be more fully understood from the following detailed description taken with the drawing wherein FIG. 1 is a circuit schematic for the reflex measuring device of the invention;

FIG. 2 shows the accelerometer of the device of the invention mounted on the leg of a subject under test;

FIG. 3 is a reduced scale showing of a strap for securing the accelerometer of the device of FIG. 2 to the subject being tested;

Figure 4:
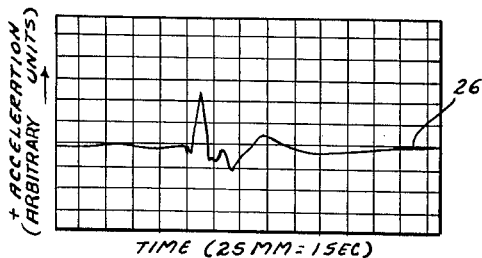
FIG. 4 shows a typical record of a patellar reflex.

In the past when measuring the reflexes of a subject it has been necessary to use a great amount of care in placing auxiliary equipment adjacent the subject and this does not lend itself to the rapid measurements required. Also, with previous devices, it has been impossible to obtain tracings of the patellar reflex and of ankle clonus on the same patient with the same measuring device.

According to this invention an accelerometer is attached above the subject's ankle. A power supply and constant speed line recorder are connected to the accelerometer so that, when the subject seated with his leg hanging free receives repeated taps on the intra-patellar tendon with a clinical reflex hammer, a record is made of the subject's reflex response. The leg having the accelerometer thereon may be crossed over the other leg at the knee in the usual manner if desired.

Referring now to FIG. 1 of the drawing which shows an accelerometer 10, which may be any very sensitive electrical type of accelerometer such as a strain gage accelerometer, the accelerometer is energized from a power supply 11 and the output of the accelerometer is recorded on a constant speed chart recorder 12. Amplification may be provided in the recorder. An electrocardiograph recorder has been used as the recording element in the device tested.

As shown in FIG. 2 the accelerometer 10 is mounted on a curved leg support 15 by means of screws 16. The leg support 15 has a padding member 17 secured thereto by any known means such as by gluing. A securing strap 18, for example of rubber, passes around the back of the leg and attaches to projections 19 and 20 on the leg support 15. The securing strap 18 should have a plurality of holes therein, as shown in FIG. 3, to provide for adjustment. The power supply and recorder leads are connected to the accelerometer by means of a cable 23 which is secured to the leg support 15 by means of a clamp 24 and screws 25 to permit mobility of the subject without putting a strain on the lead connections.

In the operation of the device of the invention the accelerometer is mounted on the leg of the subject being tested by hooking strap 18 over projection 19, passing it around the back of the leg, and attaching it to projection 20 as shown in FIG. 2. The subject is then seated with the leg, on which the accelerometer is mounted, crossed over the other leg at the knee.

Figure 5:
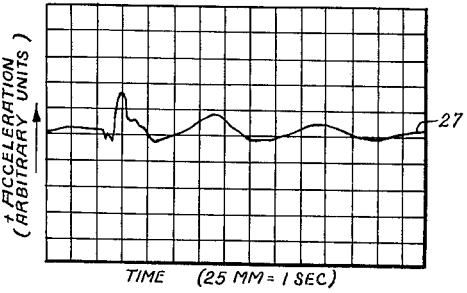
FIG. 5 shows a record of a patellar reflex for a patient that has had multiple sclerosis for over one year; and, FIG. 6 shows a record of ankle clonus for the same patient as used for obtaining the record of FIG. 5.
Figure 6:
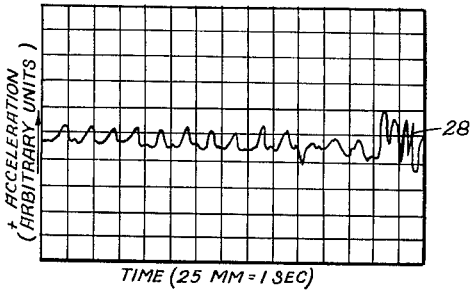

Repeated taps on the intra-patellar tendon with a clinical reflex hammer will cause a trace 26, such as shown in FIG. 4, to be recorded on the recorder chart. FIG. 5 shows a similar trace 27 for a patient that has had multiple sclerosis for over one year and FIG. 6 shows a trace for the same patient of ankle clonus. Thus these traces can be used for making clinical diagnosis. Time intervals such as time from stimulus to maximum positive acceleration, time from stimulus to maximum negative acceleration, time from maximum negative acceleration to the time to the next positive acceleration, and recovery time may be used for analysis of the trace. Because of the effect of the stimulus on the magnitude of the reflex, amplitude of the trace is given no meaning in analyzing the trace.

While the device has been described as being used in measuring the reflex in the leg, it is obvious that it could be used also to measure the response to taps on other receptor tendons such as in the arm and ankle.

There is thus provided an apparatus for obtaining accurate reproducible records of muscular responses.

While a specific embodiment has been described, it is obvious that numerous changes may be made without departing from the general principle and scope of the invention.

We claim:

A device for measuring the muscular response to a stimulus in the limb, of a subject under test, comprising: a strain gage accelerometer for providing an electrical output proportional to the acceleration experienced by said limb; a curved support adapted to substantially conform to the limb of the test subject; a pair of projections on said support; means for securing said accelerometer to said support; a pad on said support on the side thereof remote from said accelerometer; an adjustable restraining strap adapted to pass around the back of the limb of the test subject and to be attached to said projections on said support; a power supply connected to said accelerometer; and a constant speed recording means connected to said accelerometer for providing a graphical record of the muscular response of said test subject.

References Cited by the Examiner

UNITED STATES PATENTS

| | | | |
|---|---|---|---|
| 2,073,412 | 3/37 | Cappelli | 128—2 X |
| 2,565,381 | 8/51 | Leighton | 128—2 X |
| 2,716,978 | 9/55 | Torricelli | 128—2 |
| 3,103,357 | 9/63 | Berne | 73—379 X |

RICHARD A. GAUDET, *Primary Examiner.*

LOUIS R. PRINCE, *Examiner.*